(No Model.)
G. R. METTEN.
CHUCK FOR WATCHMAKERS' LATHES.
No. 259,892. Patented June 20, 1882.
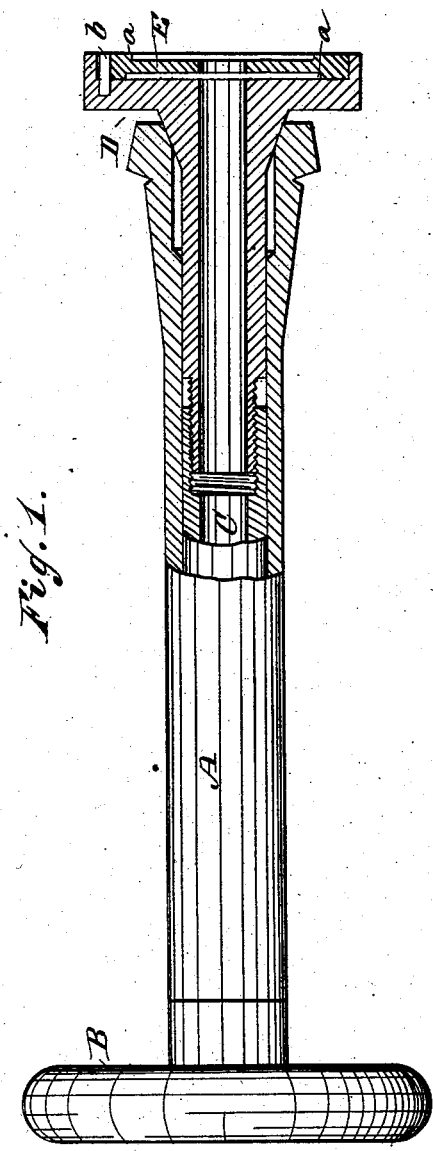
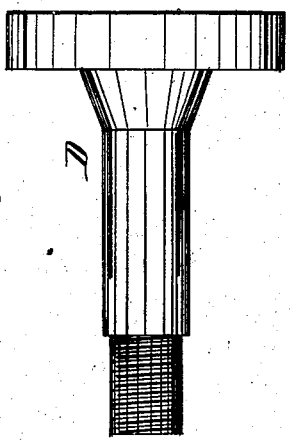
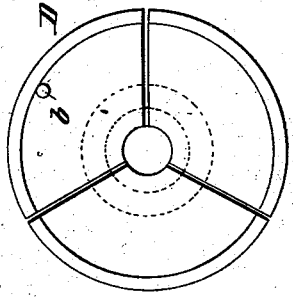
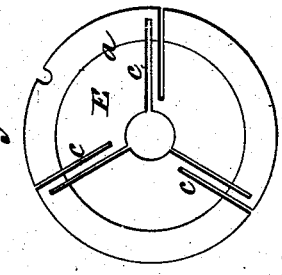
WITNESSES:
Theo. G. Hoster
C. Sedgwick
INVENTOR:
G. R. Metten
BY Munn & Co
ATTORNEYS.

UNITED STATES PATENT OFFICE.

GEORGE R. METTEN, OF HELENA, MONTANA TERRITORY.

CHUCK FOR WATCH-MAKERS' LATHES.

SPECIFICATION forming part of Letters Patent No. 259,892, dated June 20, 1882.

Application filed March 8, 1882. (No model.)

*To all whom it may concern:*

Be it known that I, GEORGE R. METTEN, of Helena, Lewis and Clarke county, Montana Territory, have invented a new and Improved Chuck for Watch-Makers' Lathes, of which the following is a full, clear, and exact description.

My invention is an improvement upon the step or wheel-chuck used by watch-makers, and has the object to furnish a simple and inexpensive chuck adapted for a wide range of work.

The invention consists in a clamping-chuck and stepped holding-disks, as hereinafter described and claimed.

Reference is to be had to the accompanying drawings, forming part of this specification, in which similar letters of reference indicate corresponding parts in all the figures.

Figure 1 is a sectional side elevation of the chuck as attached to a spindle. Fig. 2 is a face view of one holding-disk. Fig. 3 is a face view, and Fig. 4 is a side view, of the chuck detached.

A is the hollow spindle of a lathe, and B is the hand-wheel fixed to the end of the screw-sleeve C, that is within the spindle, as usual.

D is the chuck proper, engaged at its inner end by the sleeve C, and fitting the outer end of the spindle by a cone-bearing. The chuck D is split to allow of its expansion and contraction, and its outer end is recessed to receive the stepped disk E, which is clamped by contraction of the chuck. A pin, $b$, in the face of the chuck engages the disk to prevent it from turning.

The disk E is centrally apertured, and has one or more steps, $a$, on each side, formed by a circular recess, the recess on one side being of slightly greater diameter than the other, so that each disk is adapted for receiving two sizes of work. The disk is made of steel or other suitable material, and has radial slots $c$, which allow its expansion and contraction.

A set of twenty, or more or less, of the disks E belong with each single chuck D, so that all the sizes usually needed are provided for.

It will be seen that a piece of work placed in the stepped disk is held clear to the front, so that it can be readily manipulated. This is an advantage over the ordinary chuck, which has nine steps, so that only one size of work is held in front. There is also advantage in first cost, there being but one chuck and a set of disks in my case, while the old style required five chucks, each cut with nine steps; and, further, in the event of injury to one step only the disk has to be renewed, and not the whole chuck.

Having thus described my invention, I claim as new and desire to secure by Letters Patent—

1. The clamping-chuck D, formed with a recessed face, and the stepped holding-disk E, combined for use, substantially as shown and described.

2. The chucking-disk E, having a step on each side, in combination with a lathe-chuck, substantially as shown and described.

GEORGE R. METTEN.

Witnesses:
MAX H. W. BROWN,
C. H. KELLOGG.